Jan. 7, 1958   J. T. ARMBRUSTER   2,818,771
PROJECTORS
Filed May 17, 1954
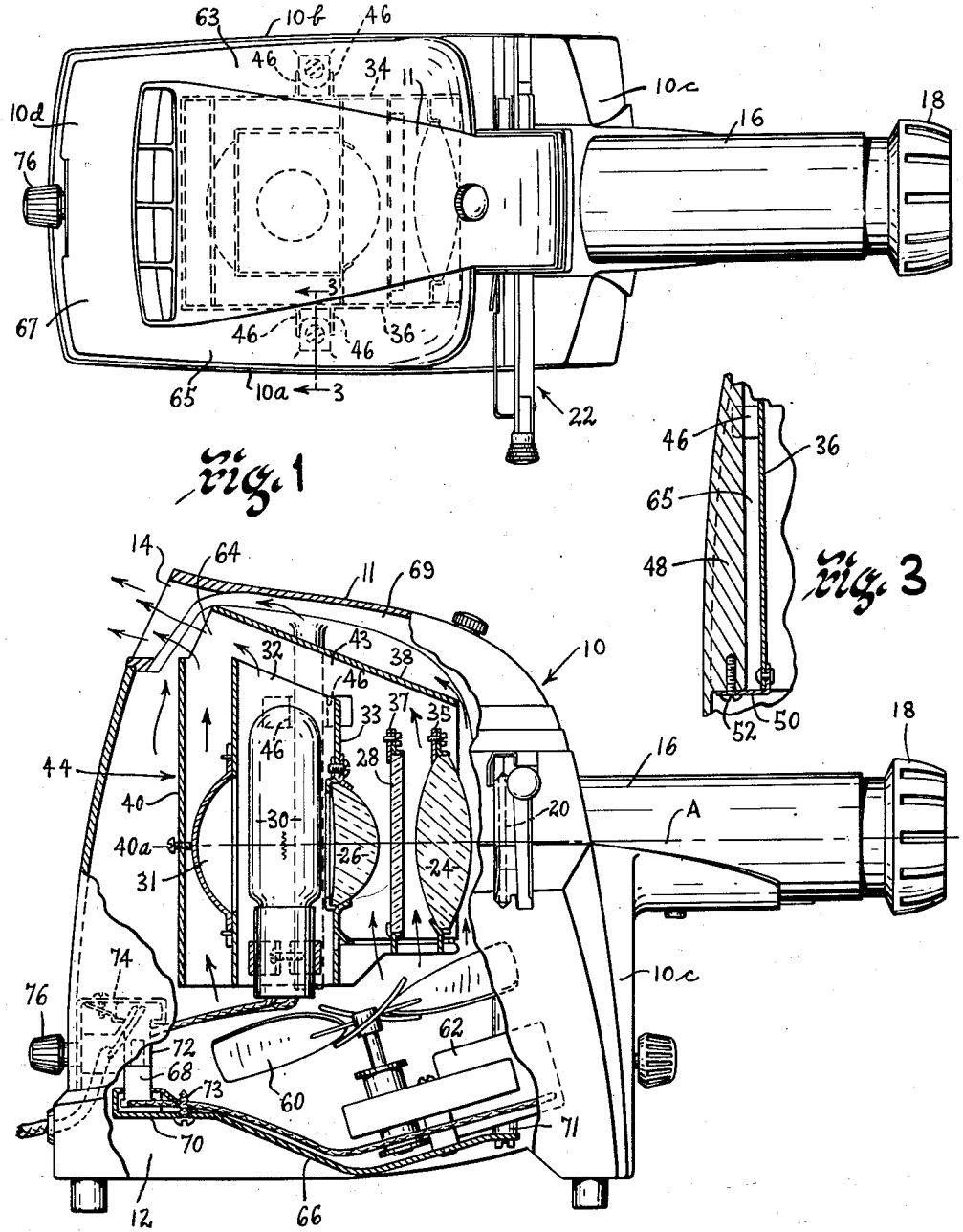
INVENTOR
JOHN T. ARMBRUSTER
BY
ATTORNEYS

United States Patent Office 2,818,771
Patented Jan. 7, 1958

2,818,771

PROJECTORS

John T. Armbruster, Niagara Falls, N. Y., assignor to American Optical Company, Southbridge, Mass., a voluntary association of Massachusetts Application May 17, 1954, Serial No. 430,110

8 Claims. (Cl. 88—26)

This invention relates to optical projectors and the like, and more particularly to improved efficient, compact and economical body constructions and arrangements including cooling systems for maintaining the projectors at desirable low operating temperatures.

In conventional slide projectors at the present time using concentrated filament light sources of increased sizes considerable heat is generated, and accordingly many and varied housing constructions and arrangements have been suggested heretofore for aiding in the dissipation and expulson of this heat energy. Not only should the photographic film being projected by such an instrument and the optical components of the instrument be maintained at safe or cool enough temperatures to avoid injury thereto, but also it is most desirable that the outer housing portions of the projector be cooled sufficiently so that same will not be too hot to be touched. Additionally, such a projector should be economical and convenient to make and assemble, and should be efficient and quiet in its operation.

The present invention provides a new, efficient, and inexpensive projector housing construction and arrangement and cooling system therefor which accomplishes the above results and which includes inner and outer enclosing wall portions so arranged that excessive heat from the high intensity light source thereof will not be transmitted to any outer wall or part of the projector housing. The carefully planned arrangement of inner and outer housing portions of the projector are such that in combination with a blower or exhaust fan not only may a plurality of interior compartments surrounding the light source be rapidly cooled, but cooled in such a manner that a surrounding compartment or chamber adjacent the outer housing of the projector will be supplied with a large quantity of cooling air. The construction and arrangement is such that the temperature of the film, condenser elements and other inner parts of the instrument will be maintained within a safe operating temperature so as to avoid injury thereto and the outer wall portions of the projector housing will be maintained at relatively low temperatures during continued use of the instrument.

It is accordingly an object of the invention to provide in a projector or the like a housing construction for enclosing a light source and the optical elements of a projector with a suitable inner and outer wall construction and arrangement which is such that the inner wall construction will direct a high velocity jet of air rapidly and forcefully outwardly through an opening therein and through a larger aligned opening in the outer wall construction in such a manner as to simultaneously exhaust or withdraw appreciable amounts of air from between the inner and outer wall portions of the instrument.

It is an additional object of the present invention to provide a construction and arrangement of the above character having said aligned exhaust openings disposed adjacent the upper rear portion of the projector housing and directed in such a manner as to discharge the heated air from the interior of the projector in a rearwardly and slightly upwardly direction and confined manner so as not to be objectionable to an operator of the instrument adjacent either side of the instrument.

It is an additional object of the invention to provide in combination with such a projector housing construction an exhaust fan or blower so disposed and so oriented as to direct its stream of air primarily into the interior of an inner housing portion of the projector and toward a funnel shaped portion thereof provided with a restricted exhaust port or opening whereby a high velocity jet discharge of air will be produced at said opening and in such a manner that a Venturi effect will be created and serves to move an envelope of cooler air from areas surrounding said inner compartment outwardly through a larger aligned opening in the outer housing of the instrument.

Other objects and advantages of the present invention will become apparent from a detailed description which follows when taken in conjunction with the accompanying drawing, in which:

Fig. 1 is a top plan view of a projector embodying the present invention;

Fig. 2 is a side elevational view of the projector of Fig. 1, parts thereof being broken away and other parts shown in section to better disclose the invention; and Fig. 3 is a fragmentary sectional view taken substantially upon line 3—3 of Fig. 1.

Referring to the drawings in detail, it will be seen that a projector embodying the present invention comprises a main housing 10 which is of a hollow cast or molded construction closed at the top 11 upon all sides 10a, 10b, 10c and 10d with the exception that the bottom of the housing is entirely open (as indicated by the numeral 12) and that an exhaust port or opening 14 is provided near an upper rear portion of the housing. The projector is in conventional manner provided with a forwardly extending tubular portion 16 for adjustably carrying an objective 18 so that it may be focused upon a film slide or the like 20 when operatively positioned in the projector.

The film slide may be moved into and out of this operative position by a slide changer generally indicated by the numeral 22 but since the details of such structure do not form a part of the present invention same will not be further described at this time. For details of the construction and manner of operation of such a slide changer reference may be made to copending application Serial No. 389,449 which was filed in the U. S. Patent Office October 30, 1953.

As may be clearly seen from Fig. 2, disposed in optical alignment along an optical axis A and rearwardly of the objective 18 are the film slide 20, condenser elements 24 and 26, the heat screen 28, a concentrated filament light source 30 and a spherical reflector 31. Surrounding the light source 30 on both sides and the rear is an interior sheet metal partition or wall 32 and a suitable transversely extending sheet metal wall member 33 supports this partition. Attachment means are provided at opposite side edges of the member 33 for mounting this member upon a pair of spaced interior side walls 34 and 36. The interior side walls 34 and 36 are preferably but not necessarily integrally secured to an upwardly and rearwardly sloping top interior wall 38 and a substantially vertically extending interior rear wall 40. The rear wall of the partition 32 is centrally apertured and locating pins are arranged adjacent thereto for receiving perforated ears extending from the spherical mirror 31.

Thus it will be seen that the partition 32 and rear wall 40 carrying clamping screw 40a jointly provide means whereby the spherical mirror 31 may be releasably held in alignment with the light source and the optical system of the projector. The transverse wall 33 is centrally apertured and provided with means for securing condenser lens element 26 in place therein. Apertured panels 35 and 37 similarly support condenser lens 24 and heat screen 28 and extend transversely so as to be removably supported by the side walls 34 and 36. An interior housing 44 is thus formed as a single unit for supporting in an aligned manner the above mentioned optical components and this interior housing may be inserted in the main housing 10 or removed therefrom readily through the open bottom thereof. The housing unit 44, it will be seen in Fig. 3, is maintained in fixed but detachable spaced relation relative to the opposite side walls 10a and 10b of the main housing 10 by means of pairs of wings or tabs 46, struck out from the side walls 34 and 36, which pairs straddle and engage opposite sides of integral vertical ribs 48 formed on the inside of the side walls 10a and 10b, and by a pair of apertured tabs 50 at the lower edge of each side wall 34 and 36 receiving securing screws 52 threaded into the bottoms of the vertical ribs. The interior housing 44 thus may be readily slipped into the main housing 10 through the open bottom thereof and since the pairs of tabs 46 have resilient straddling clamping engagement with the vertically extending ribs 48 the housing unit 44 will be firmly maintained in a fixed operative relation relative to the main housing 10 by the two securing screws 52.

The interior side walls 34 and 36, the top wall 38 and the rear wall 40 are so disposed relative to each other that they jointly form a funnel-like or funnel shaped inner chamber within the housing 44 and surrounding the condenser elements, the heat screen and the light source. The partition 32, transverse wall 33 and the panels 35 and 37 within this chamber terminate at their upper edges in spaced relation to the sloping top wall 38 and thus form an extended passageway 43 which is directed upwardly and rearwardly. The spaced arrangement of the vertical walls and panels 32, 33, 35, 37 and 40 is such that vertical passageways are formed therebetween which communicate with the passageway 43.

A wide restricted exit opening for the funnel shaped inner chamber is provided at 64 between the adjacent edges of the walls 38 and 40, and this opening is located adjacent but inwardly of the exhaust port 14 in the main housing 10.

Upwardly tapering air channels 63 and 65 are thus provided at the opposite sides of the projector between the inner and outer walls 34 and 10a and walls 36 and 10b, and an upwardly tapering rear air channel 67 is provided between inner and outer walls 40 and 10d. A tapering upper air channel 69 is likewise provided between the top 11 and sloping inner wall 38. Accordingly, a fan 60 disposed beneath the forward part of the inner housing 44 and carried by an electrical motor 62, is oriented in an upwardly and rearwardly direction so that an air blast therefrom will pass upwardly through and around these interior parts of the projector. Some forced air will also travel upwardly around the slide 20 being projected also. The air being directed upwardly and rearwardly within the funnel shaped inner chamber will be forced into a gradually diminishing cross sectional area with the result that an increased air velocity will be produced as this cooling air apraches the wide restricted opening 64. The increased air velocity effected at the restricted opening 64 produces a Venturi effect since this opening is of appreciably smaller size than the exhaust port adjacent thereto. Thus during use of the projector a "drag" or suction effect is produced upon the air at the port 14 surrounding the high velocity blast of hot air being forced out of the interior through opening 64. The result of this structural arrangement is that the rapidly moving jet of very hot air from the inner housing will be surrounded by an envelope of slower moving air heated to a lesser degree and passing between the interior housing 44 and outer main housing 10 and aiding in cooling adjacent outer wall portions of the projector. Of course, it is true that some air propelled by the fan 60 may travel outwardly around this interior housing 44 and provide some cooling effect, but the greater part of the air blast is directed through the inner housing and serves to carry off the major part of the heat energy.

As stated above, the electric motor driven fan 60 is positioned so that it will direct its air blast mainly upwardly and rearwardly into the funnel shaped interior of housing 44. This is accomplished by having the fan motor 62 secured to a T-shaped brace 66 having forward end connections with opposite inner side wall portions of the main housing 10 as indicated at 71 and extending centrally rearwardly so that its rear end portion may be supported by an electric plug 68 clamped thereto by means 73, which plug 68 is in turn provided with a pair of contact blades having detachable frictional engagement within the interior of an electric socket 72. The socket 72 is in turn releasably clamped to a bracket 74 positioned within a lower part of the main housing 10 and adjacent an on-off switch 76 of conventional type and which extends therethrough and clamps bracket 74 in place.

Thus, it will be seen that it is a comparatively simple matter to remove the securing screws at the forward end of the brace 66 and then withdraw the blades of the plug 68 from the interior of the socket 72 when removing the motor from the projector. After this has been done, it is also an easy matter to insert or remove the entire interior housing 44 and the optical elements therein as a unit assembly by merely removing the two securing screws 52.

From the foregoing, it will be readily appreciated that a simple, efficient and readily accessible projector construction and arrangement is provided including inner and outer housing means for supporting and positioning a light source and associated optical parts within the projector and at the same time provide an improved cooling system therefor. Such a projector has been found in actual practice to be very efficient in maintaining not only the exterior of the main housing but also internal parts thereof at relatively low operating temperatures.

Having described my invention, I claim:

1. An optical projector comprising a main housing having an objective adjustably carried thereby, said housing having enclosing top, front, rear and side walls and an open bottom, an interior housing carried by said main housing and having top, rear and side walls in spaced relation to the top, rear and side walls of said main housing and serving to enclose a light source and light condensing means of said projector, the top and rear walls of said interior housing being so angularly disposed relative to each other as to provide a funnel shaped interior surrounding said light source and said light condensing means and so spaced from each other as to define an exhaust opening therebetween, an exhaust opening of slightly larger size in said main housing in spaced general alignment with said first mentioned opening, a pair of vertically extending lugs upon opposite inner side wall portions of said main housing, a pair of tabs upon an upper part of each interior side wall engaging opposite sides of the lug adjacent thereto, a horizontally disposed tab on a lower part of each interior side wall, and releasable securing means holding each horizontal tab in fixed relation relative to the bottom of the lug adjacent thereto, whereby heated air from said interior housing may be discharged through said openings in such a manner as to cause a simultaneous discharge of air from the air channels formed between said interior and said main housings, and whereby said interior housing, light source and light condensing means may be readily removed as a unit when desired from said main housing through the open bottom thereof.

2. An optical projector comprising a main housing having an objective adjustably carried thereby, said housing having enclosing top, front, rear and side walls and an open bottom, an interior housing carried by said main housing and having top, rear and side walls in spaced relation to the top, rear and side walls of said main housing and serving to enclose a light source and light condensing means of said projector, the top and rear walls of said interior housing being so angularly disposed relative to each other as to provide a funnel shaped interior surrounding said light source and said light condensing means and so spaced from each other as to define an exhaust opening therebetween, an exhaust opening of slightly larger size in said main housing in spaced general alignment with said first mentioned opening, the adjacent top, rear and side walls of said interior and main housings being so disposed relative to each other as to form top, rear and side air channels which taper toward and communicate with said larger exhaust opening, a pair of vertically extending lugs upon opposite inner side wall portions of said main housing, a pair of tabs upon an upper part of each interior side wall engaging opposite sides of the lug adjacent thereto, a horizontally disposed tab on a lower part of each interior side wall, and releasable securing means holding each horizontal tab in fixed relation relative to the bottom of the lug adjacent thereto, whereby heated air from said interior housing may be discharged through said openings in such a manner as to cause a simultaneous discharge of air from said tapered air channels, and whereby said interior housing, light source and light condensing means may be readily removed as a unit when desired from said main housing through the open bottom thereof.

3. An optical projector comprising a main housing having an objective adjustably carried thereby, said housing having enclosing top, front, rear and side walls and an open bottom, an interior housing carried by said main housing and having top, rear and side walls in spaced relation to the top, rear and side walls of said main housing and serving to enclose a light source and light condensing means of said projector, the top and rear walls of said interior housing being so angularly disposed relative to each other as to provide a funnel shaped interior surrounding said light source and said light condensing means and so spaced from each other as to define an exhaust opening therebetween, an exhaust opening of slightly larger size in said main housing in spaced general alignment with said first mentioned opening, a pair of vertically extending lugs upon opposite inner side wall portions of said main housing, a pair of tabs upon an upper part of each interior side wall engaging opposite sides of the lug adjacent thereto, a horizontally disposed tab on a lower part of each interior side wall, releasable securing means holding each horizontal tab in fixed relation relative to the bottom of the lug adjacent thereto, and an electric motor operated fan removably located within a lower portion of said main housing and disposed so as to direct a stream of cooling air upwardly and rearwardly toward said funnel shaped interior housing and for increasing the velocity of the cooling air passing outwardly through the exhaust opening in said interior housing, whereby heated air from said interior housing may be discharged through said openings in such a manner as to cause a simultaneous discharge of air from the air channels formed between said interior and said main housings, and whereby said electric motor operated fan may be removed and thereafter said interior housing, light source and light condensing means may be readily removed as a unit when desired from said main housing through the open bottom thereof.

4. An optical projector comprising a main housing having an objective adjustably carried thereby, said housing having enclosing top, front, rear and side walls and an open bottom, an interior housing carried by said main housing and having top, rear and side walls in spaced relation to the top, rear and side walls of said main housing and serving to enclose a light source and light condensing means of said projector, the top and rear walls of said interior housing being so angularly disposed relative to each other as to provide a funnel shaped interior surrounding said light source and said light condensing means and so spaced from each other as to define an exhaust opening therebetween, an exhaust opening of slightly larger size in said main housing in spaced general alignment with said first mentioned opening, the adjacent top, rear and side walls of said interior and main housings being so disposed relative to each other as to form top, rear and side air channels which taper toward and communicate with said larger exhaust opening, and an electric motor operated fan removably located within a lower portion of said main housing and disposed so as to direct a stream of cooling air upwardly and rearwardly toward said funnel shaped interior housing and for increasing the velocity of the cooling air passing outwardly through the exhaust opening in said interior housing, a pair of vertically extending lugs upon opposite inner side wall portions of said main housing, a pair of tabs upon an upper part of each interior side wall engaging opposite sides of the lug adjacent thereto, a horizontally disposed tab on a lower part of each interior side wall, and releasable securing means holding each horizontal tab in fixed relation relative to the bottom of the lug adjacent thereto, whereby heated air from said interior housing may be discharged through said openings in such a manner as to cause a simultaneous discharge of air from said tapered air channels, and whereby said electric motor operated fan may be removed and thereafter said interior housing, light source, and light condensing means may be readily removed as a unit when desired from said main housing through the open bottom thereof.

5. An optical projector comprising a main housing having an objective adjustably carried thereby, said housing having top, front, rear and side walls which interconnect so as to substantially completely enclose the interior of said main housing above the bottom thereof, the bottom portions of said front, rear and side walls together defining a relatively large open bottom, an interior housing carried by said main housing and having interconnected top, rear and side walls in spaced relation to the top, rear and side walls respectively of said main housing and serving to enclose a light source and light condensing means of said projector, the top and rear walls of said interior housing being so angularly disposed relative to each other as to provide with said interior side walls an upwardly and rearwardly directed funnel-shaped interior surrounding said light source and said light condensing means, said interior top, rear and side walls at the upper and rear parts thereof being so spaced from each other as to define an upwardly and rearwardly directed exhaust opening therebetween for said funnel-shaped interior, an upwardly and rearwardly directed opening of slightly larger size in the upper rear portion of said main housing in spaced general alignment with said first mentioned opening, whereby heated air from said interior housing will be discharged upwardly and rearwardly through said openings in such a manner as to cause a simultaneous discharge of air from all of the air channels formed between said interior housing and said main housing.

6. An optical projector comprising a main housing having an objective adjustably carried thereby, said housing having top, front, rear and side walls which interconnect so as to substantially completely enclose the interior of said main housing above the bottom thereof, the bottom portions of said front, rear and side walls together defining a relatively large open bottom, an interior housing carried by said main housing and having interconnected top, rear and side walls in spaced relation to the top, rear and side walls respectively of said main housing and serving to enclose a light source and light condensing means of said projector, the top and rear walls of said interior housing being so angularly disposed relative to each other as to provide with said interior side walls an upwardly and rearwardly directed funnel-shaped interior surrounding said light source and said light condensing means, said interior top, rear and side walls at the upper and rear parts thereof being so spaced from each other as to define an upwardly and rearwardly directed exhaust opening therebetween for said funnel-shaped interior, an upwardly and rearwardly directed exhaust opening of slightly larger size in the upper rear portion of said main housing in spaced general alignment with said first mentioned opening, the adjacent top, rear and side walls of said interior housing and main housing being so disposed relative to each other as to form top, rear and side air channels which taper toward and communicate with said larger exhaust opening, whereby heated air from said interior housing will be discharged upwardly and rearwardly through said openings in such a manner as to cause a simultaneous discharge of air from all of said tapered air channels.

7. An optical projector comprising a main housing having an objective adjustably carried thereby, said housing having top, front, rear and side walls which interconnect so as to substantially completely enclose the interior of said main housing above the bottom thereof, the bottom portions of said front, rear and side walls together defining a relatively large open bottom, an interior housing carried by said main housing and having interconnected top, rear and side walls in spaced relation to the top, rear and side walls respectively of said main housing and serving to enclose a light source and light condensing means of said projector, the top and rear walls of said interior housing being so angularly disposed relative to each other as to provide with said interior side walls an upwardly and rearwardly directed funnel-shaped interior surrounding said light source and said light condensing means, said interior top, rear and side walls at the upper and rear parts thereof being so spaced from each other as to define an upwardly and rearwardly directed exhaust opening therebetween for said funnel-shaped interior, an upwardly and rearwardly directed opening of slightly larger size in the upper rear portion of said main housing in spaced general alignment with said first mentioned opening, and an electric motor operated fan located within a lower portion of said main housing and adjacent said open bottom and disposed so as to direct a stream of cooling air upwardly and rearwardly toward said funnel-shaped interior housing, said fan increasing the velocity of the cooling air passing upwardly and rearwardly through the opening in said interior housing, whereby heated air from said interior housing will be discharged through said openings in such a manner as to cause a simultaneous discharge of air from all of the air channels formed between said interior housing and said main housing.

8. An optical projector comprising a main housing having an objective adjustably carried thereby, said housing having top, front, rear and side walls which interconnect so as to substantially completely enclose the interior of said main housing above the bottom thereof, the bottom portions of said front, rear and side walls together defining a relatively large open bottom, an interior housing carried by said main housing and having interconnected top, rear and side walls in spaced relation to the top, rear and side walls respectively of said main housing and serving to enclose a light source and light condensing means of said projector, the top and rear walls of said interior housing being so angularly disposed relative to each other as to provide with said interior side walls an upwardly and rearwardly directed funnel-shaped interior surrounding said light source and said light condensing means, said interior top, rear and side walls at the upper and rear parts thereof being so spaced from each other as to define an upwardly and rearwardly directed exhaust opening therebetween for said funnel-shaped interior, an upwardly and rearwardly directed exhaust opening of slightly larger size in the upper rear portion of said main housing in spaced general alignment with said first mentioned opening, the adjacent top, rear and side walls of said interior housing and main housing being so disposed relative to each other as to form top, rear and side air channels which taper toward and communicate with said larger exhaust opening, and an electric motor operated fan located within a lower portion of said main housing and adjacent said open bottom and disposed so as to direct a stream of cooling air upwardly and rearwardly toward said funnel-shaped interior housing, said fan increasing the velocity of the cooling air passing upwardly and rearwardly through the exhaust opening in said interior housing, whereby heated air from said interior housing will be discharged through said openings in such a manner as to cause a simultaneous discharge of air from all of said tapered air channels.

References Cited in the file of this patent

UNITED STATES PATENTS

| Number | Name | Date |
|---|---|---|
| 1,287,576 | De Vry | Dec. 10, 1918 |
| 1,489,332 | Outrey | Apr. 8, 1924 |
| 1,716,322 | Proctor | June 4, 1929 |
| 1,966,531 | Tint | July 17, 1934 |
| 1,971,454 | Loomis | Aug. 28, 1934 |
| 2,048,214 | Howell et al. | July 26, 1936 |
| 2,281,988 | Osterberg et al. | May 5, 1942 |
| 2,362,601 | Wengel | Nov. 14, 1944 |
| 2,449,713 | Nemeth | Sept. 21, 1948 |
| 2,550,272 | Karr | Apr. 24, 1951 |
| 2,597,449 | Cassidy et al. | May 20, 1952 |
| 2,614,458 | Critoph et al. | Oct. 21, 1952 |
| 2,727,430 | Goldberg | Dec. 20, 1955 |

FOREIGN PATENTS

| 750,979 | France | June 12, 1933 |